United States Patent
Park et al.

(10) Patent No.: US 9,465,574 B2
(45) Date of Patent: Oct. 11, 2016

(54) SYSTEM FOR CONTROLLING SOUND WAVE BASED TOUCH RECOGNITION INTERFACE

(71) Applicant: Hyundai Motor Company, Seoul (KR)

(72) Inventors: Sung Min Park, Seoul (KR); Hui Sung Lee, Gyeonggi-do (KR); Sung Jin Sah, Gyeonggi-do (KR); Kwang Myung Oh, Daejeon (KR)

(73) Assignee: Hyundai Motor Company, Seoul (KR)

( * ) Notice: Subject to any disclaimer, the term of this patent is extended or adjusted under 35 U.S.C. 154(b) by 99 days.

(21) Appl. No.: 14/533,788

(22) Filed: Nov. 5, 2014

(65) Prior Publication Data
US 2015/0370532 A1 Dec. 24, 2015

(30) Foreign Application Priority Data
Jun. 24, 2014 (KR) .................. 10-2014-0077425

(51) Int. Cl.
*G06F 3/16* (2006.01)
*G08C 23/02* (2006.01)

(52) U.S. Cl.
CPC .............. *G06F 3/167* (2013.01); *G08C 23/02* (2013.01); *G08C 2201/31* (2013.01)

(58) Field of Classification Search
CPC .......... G06F 3/16; G06F 3/167; G08C 23/02; B06R 16/023
USPC ................. 367/197, 198; 340/407.2, 13.24, 340/539.12, 10.1, 573.1, 575, 12.3, 12.54, 340/12.55
See application file for complete search history.

(56) References Cited

U.S. PATENT DOCUMENTS

| | | | |
|---|---|---|---|
| 8,154,527 B2 * | 4/2012 | Ciesla | G06F 3/04886 178/18.01 |
| 8,537,119 B1 | 9/2013 | Grivna et al. | |
| 2011/0141033 A2 | 6/2011 | Mr. Han | |
| 2012/0086651 A1 | 4/2012 | Kwon et al. | |
| 2015/0063074 A1 * | 3/2015 | Oh | B60R 16/023 367/197 |

FOREIGN PATENT DOCUMENTS

| | | |
|---|---|---|
| JP | 2012-069048 A | 4/2012 |
| JP | 2013-038755 A | 2/2013 |
| KR | 10-2007-0045954 | 5/2007 |
| KR | 10-0856919 | 9/2008 |
| KR | 10-2011-0067755 | 6/2011 |
| KR | 10-2012-0037295 A | 4/2012 |
| KR | 10-2013-0062992 | 6/2013 |
| KR | 10-2013-0072562 A | 7/2013 |

* cited by examiner

*Primary Examiner* — Allen T Cao
(74) *Attorney, Agent, or Firm* — Mintz Levin Cohn Ferris Glovsky and Popeo, P.C.; Peter F. Corless

(57) ABSTRACT

A system for controlling a sound wave-based touch recognition interface includes: an auditory user interface (AUI) pad configured to transfer a sound wave, a sound wave recognition member configured to convert the sound wave transferred from the AUI pad into an electrical signal, and an actuator member attached to one side of the AUI pad and configured to be deformed in response to the electrical signal converted by the sound wave recognition member.

12 Claims, 6 Drawing Sheets

SYSTEM FOR CONTROLLING SOUND WAVE BASED TOUCH RECOGNITION INTERFACE

CROSS-REFERENCE TO RELATED APPLICATION

This application is based on and claims the benefit of and priority to Korean Patent Application No. 10-2014-0077425, filed on Jun. 24, 2014 in the Korean Intellectual Property Office, the disclosure of which is incorporated herein in its entirety by reference.

TECHNICAL FIELD

The present disclosure relates to a system for controlling a sound wave-based touch recognition interface, and more particularly, to a system for controlling a sound wave-based touch recognition interface performing instruction words using a sound wave generated at the time of tapping a pad.

BACKGROUND

Touch recognition interfaces have been widely used in home appliances such as mobile phones, smart phones, notebooks, smart TVs, smart refrigerators, audio devices, and the like. Touch recognition interfaces typically use a method of sensing static electricity, sound wave, vibration, and the like to perform a particular instruction. For example, a technology for a touch recognition interface according to the related art has been disclosed in Korean Patent Publication No. 10-0856919.

However, it is difficult for the touch recognition interface technologies according to the related art to support a blind control which enables a user to identify a portion of a touch pad only by tactile sensation, without directly confirming the identified portion with the naked eye. Therefore, when surface roughness of the touch pad is not noticeably different, the user needs to directly identify the portion at which the user's finger is located with the naked eye in order to confirm at which portion of the touch pad a user's finger is located, which causes an inconvenience when in use.

Further, a sound wave recognition-based interface needs to generate a sound wave, and therefore requires a strong touch. However, since an impact when touching the touch pad surface is already transferred to a user's finger or joint, the sound wave recognition based interface may give the user pain. In addition, considering the characteristics of the touch pad, the user may not feel a certain physical feedback, such as being pressed or turned-on in the case of a button, and therefore touch sensation can be insufficient. That is, it may be difficult for the user to recognize whether he/she accurately inputs instructions.

SUMMARY

The present disclosure has been made to solve the above-mentioned problems occurring in the related art while advantages achieved by the related art are maintained intact.

An aspect of the present disclosure provides a system for controlling a sound wave-based touch recognition interface capable of improving convenience, safety, and touch sensation for a user.

According to an embodiment of the present disclosure, a system for controlling a sound wave based touch recognition interface includes: an auditory user interface (AUI) pad configured to transfer a sound wave; a sound wave recognition member configured to convert the sound wave transferred from the AUI pad into an electrical signal; and an actuator member attached to one side of the AUI pad and configured to be deformed in response to the electrical signal converted by the sound wave recognition member.

The system may further include: a controller configured to receive the electrical signal from the sound wave recognition member to control the deformation of the actuator member. The AUI pad may be locally deformed. When an external pressure is applied to the AUI pad, the AUI pad may be locally deformed by the external pressure, and the actuator member may be deformed by the external pressure. Conversely, when an external pressure is applied to the AUI pad, the AUI pad may be locally deformed by the external pressure, and the actuator member may not be deformed by the external pressure. The AUI pad may be locally deformed along with the deformation of the actuator member. The actuator member may be one of a plurality of actuator members, and only some of the plurality of actuator members may be operated. The actuator member may be one of a plurality of actuator members, and all of the plurality of actuator members may be operated. An operation of the actuator member may stop to change one or more vibration characteristics of the AUI pad. One or more vibration characteristics of the AUI pad may be changed based on when the actuator member is not deformed, when the actuator member is substantially completely deformed, or when the actuator member is partially deformed. Notably, when the actuator member is not deformed, the actuator member may be flat, when the actuator member is substantially completely deformed, both ends of the actuator member may be warped, and when the actuator member is partially deformed, only one end of the actuator member may be deformed. The system for controlling the sound wave-based touch recognition interface may be applied to an interface of a vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
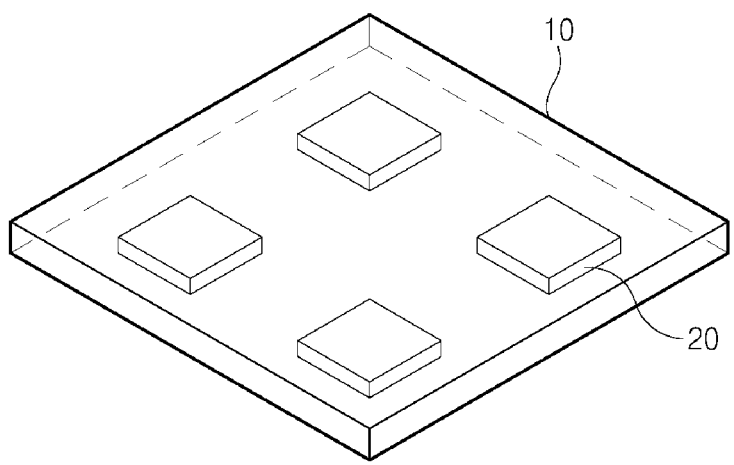
FIG. 1 is a perspective view illustrating an AUI pad through which an actuator member is revealed, in a system for controlling a sound wave-based touch recognition interface according to an embodiment of the present disclosure.

Hereinafter, embodiments of the present disclosure will be described in detail with reference to the accompanying drawings. However, the present disclosure will be not limited or restricted to the embodiments below. Like reference numerals proposed in each drawing denote like components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods may be executed by at least one controller. The term "controller" refers to a hardware device that includes a memory and a processor. The memory is configured to store program instructions, and the processor is configured to execute the program instructions to perform one or more processes which are described further below.

Figure 2:
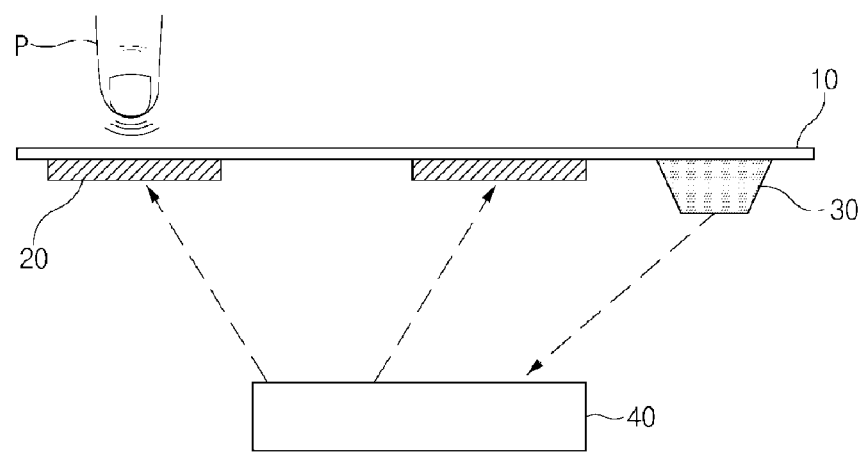
FIG. 2 is a configuration diagram schematically illustrating an overall structure of a system for controlling a sound wave-based touch recognition interface according to an embodiment of the present disclosure.

FIG. 1 is a perspective view illustrating an AUI pad through which an actuator member is revealed, in a system for controlling a sound wave-based touch recognition interface according to an embodiment of the present disclosure and FIG. 2 is a configuration diagram schematically illustrating an overall structure of a system for controlling a sound wave-based touch recognition interface according to an embodiment of the present disclosure.

As illustrated in FIGS. 1 and 2, the system includes an auditory user interface (AUI) pad 10 transferring a sound wave, a sound wave recognition member 30 converting the sound wave transferred from the AUI pad 10 into an electrical signal, and an actuator member 20 attached to one side of the AUI pad 10 and thus deformed in response to the electrical signal converted by the sound wave recognition member 30.

The sound wave-based touch recognition interface according to an embodiment of the present disclosure may be installed inside a vehicle such as an automobile, and in particular, may be applied to an interface for a music functional group such as an audio and radio of the vehicle or an interface for a conditioner functional group such as an air conditioner, a fan heater, heat rays, and the like. However, the sound wave-based touch recognition interface is not limited thereto and may also be applied to any interface which is applied inside the vehicle.

The AUI pad 10 serves to transfer a sound wave generated by making a user contact the AUI pad 10 or apply an impact to the AUI pad 10 using his/her hand P, or the like from an external source. The AUI pad 10 may be locally deformed due to the contact or the impact from the external source.

The sound wave recognition member 30 is attached on one side of the AUI pad 10. Preferably, the sound wave recognition member 30 is attached on an opposite surface to the surface of the AUI pad 10 to which the user's hand P, or the like is contacted. The sound wave recognition member 30 may include, for example, a sound wave recognition microphone, or the like, but the present disclosure is not limited thereto. Therefore, when the sound wave recognition member 30 converts the sound wave generated from the AUI pad 10 into an electrical signal, the sound wave recognition member may alternatively include other microphones, sound wave sensors, or the like, which are generally used, according to a demand of those skilled in the art.

The actuator member 20 may be attached to one side of the AUI pad 10 on which the sound wave recognition member 30 is attached. In this case, a controller 40 receives the electrical signal from the sound wave recognition member 30 to control the deformation of the actuator member 20. The actuator member 20, which may include, for example, a bimetal, shape memory alloys, ER fluid, and the like, is configured to be warped or spread in response to the electrical signal. Further, the actuator member 20 may be formed in plural, i.e., may represent one actuator member of a plurality of actuator members, and the plurality of actuator members 20 may be substantially entirely or partially deformed.

Figure 3:
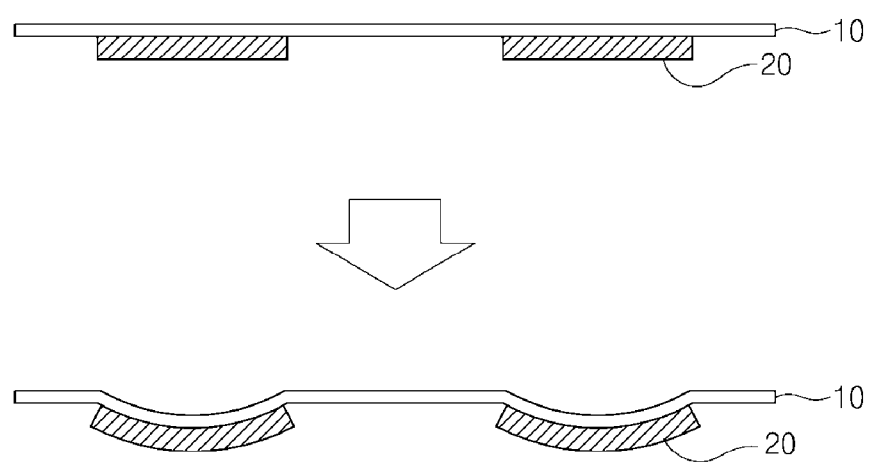
FIG. 3 is a use state diagram illustrating an operation of a control device of the sound wave-based touch recognition interface according to an embodiment of the present disclosure.
Figure 4:
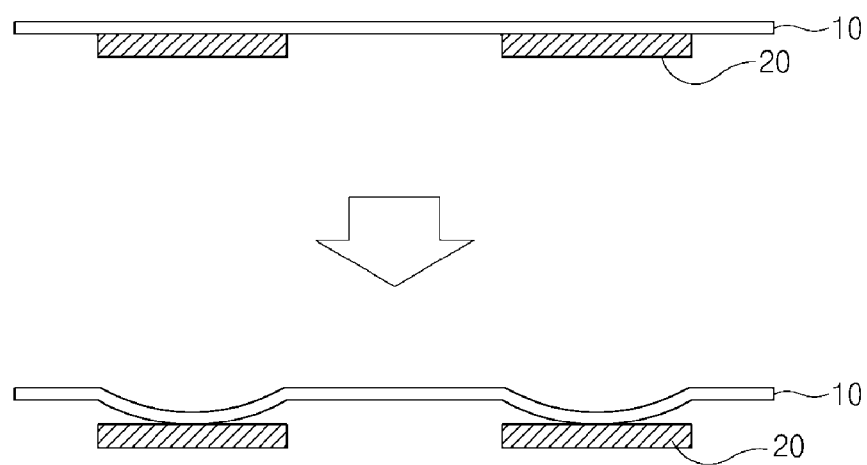
FIG. 4 is a use state diagram illustrating an operation of a control device of a sound wave-based touch recognition interface according to an embodiment of the present disclosure.
Figure 5:
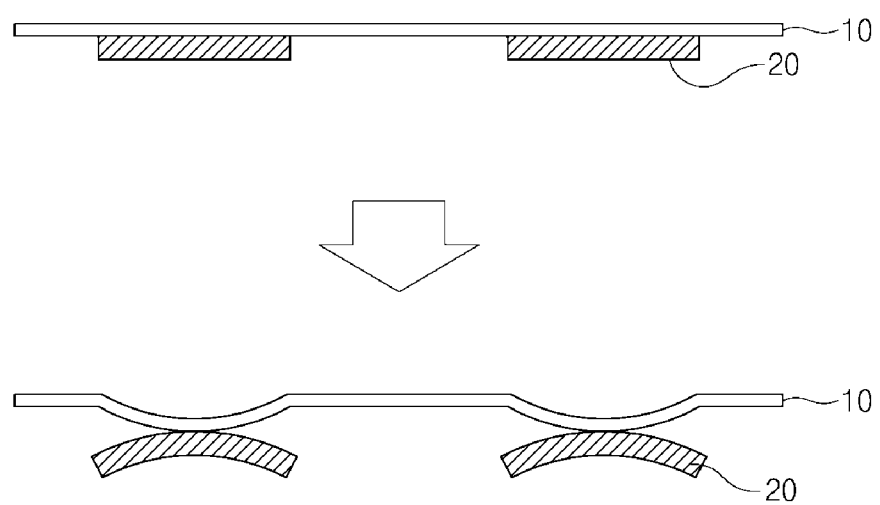
FIG. 5 is a use state diagram illustrating an operation of a control device of a sound wave-based touch recognition interface according to an embodiment of the present disclosure.
Figure 6:
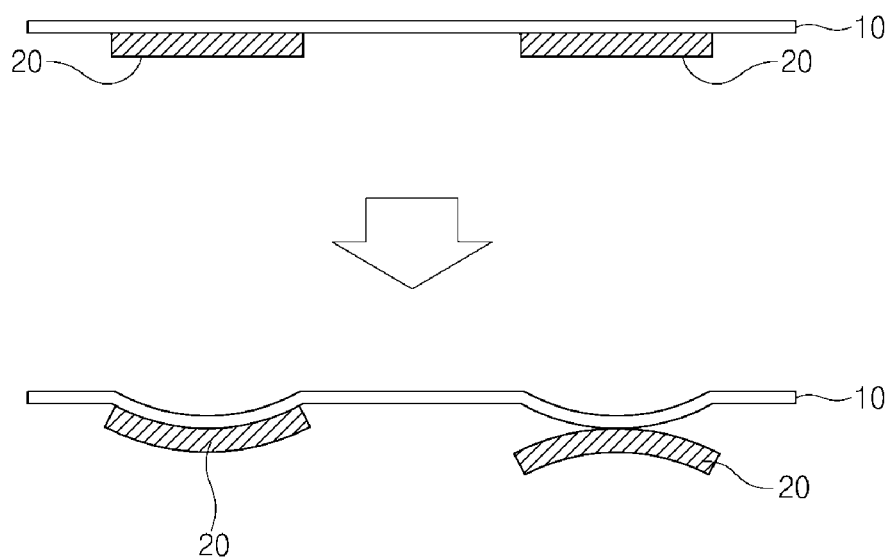
FIG. 6 is a use state diagram illustrating an operation of a control device of a sound wave-based touch recognition interface according to an embodiment of the present disclosure.

FIG. 3 is a use state diagram illustrating an operation of a control device of the sound wave-based touch recognition interface according to an embodiment of the present disclosure, FIG. 4 is a use state diagram illustrating an operation of a control device of a sound wave-based touch recognition interface according to an embodiment of the present disclosure, FIG. 5 is a use state diagram illustrating an operation of a control device of a sound wave-based touch recognition interface according to an embodiment of the present disclosure, and FIG. 6 is a use state diagram illustrating an operation of a control device of a sound wave-based touch recognition interface according to an embodiment of the present disclosure.

An operation of the actuator member 20 will be described in more detail with reference to FIGS. 3 to 6. An arrow in FIGS. 3 to 6 differentiates before and after the operation of the actuator member 20. Here, it is to be noted that upper portions illustrated in FIGS. 3 to 6 show before the operation and lower portions show after the operation.

As illustrated in FIG. 3, the actuator member 20 is attached on one side of the AUI pad 10 and thus may be deformed to be warped in a direction in which the actuator member 20 contacts the AUI pad 10 or a direction of force in which an impact is applied to the AUI pad according to the sound wave generated by making the user contact the AUI pad 10 or apply an impact to the AUI pad 10 from the outside.

However, the AUI pad 10 can be deformed so that the portion to which the actuator member 20 is attached is locally depressed along with the actuator member 20. Therefore, the present disclosure provides a blind control which enables the user to identify which portion of the AUI pad 10 needs to be touched before and after the AUI pad 10 is touched, or whether the AUI pad 10 is touched by tactile sensation of his/her hand, and the like, without confirming the portion with the naked eye.

Further, when the user contacts the AUI pad 10 or applies an impact to the AUI pad 10 using his/her finger, or the like, the contacted portion of the AUI pad 10 or the portion of the AUI pad 10 to which the impact is applied is rapidly depressed, and as a result, when the impact strength is large, the impact applied to the user may be reduced. In addition, while the actuator member 20 is warped due to the contacted portion of the AUI pad 10 or the portion of the AUI pad 10 to which the impact is applied, the AUI pad 10 can be depressed and recovered along with the actuator member 20 in the direction in which the force is locally applied rapidly. The physical touch sensation may be similarly implemented.

Meanwhile, as illustrated in FIG. 4, even though the AUI pad 10 may be deformed when locally depressed, a shape of the actuator member 20 may not be deformed. As illustrated in FIG. 5, the actuator member 20 may be deformed so as to be warped in an opposite direction of the force applied to the AUI pad 10. As illustrated in FIG. 6, some of the plurality of actuator members 20 can be warped in the direction of the force applied to the AUI pad 10, and others thereof may be deformed to be warped in an opposite direction thereto.

As such, by making the deformation of the actuator member 20 different, which portion of the AUI pad 10 is a functional region or a non-functional region may be differentiated by the tactile sensation, or the like. Also, the functional group for each portion of the AUI pad 10 may be differentiated only by the tactile sensation to make the use of the user's desired function. That is, when the actuator member 20 is activated in another shape according to the functional group, the user may easily identify whether he/she currently controls a music functional group or controls the conditioner functional group, or whether the AUI pad 10 is activated or inactivated only by groping for the AUI pad 10.

Further, when the plurality of actuator members 20 attached to each portion of the AUI pad 10 are deformed differently from each other, the sound wave can be generated differently for each portion at the time of touching the AUI pad 10, such that the controller 40 may differentiate the touched position of the AUI pad 10 using the single sound wave recognition member 30. Even further, an embodiment of the present disclosure may generate another sound wave even when the same touched impact is applied to the AUI pad 10 based on the deformation of the actuator member 20, and whether the user's finger, or the like is grounded. Therefore, even though the user inputs an instruction word of, for example, a three-beat rhythm pattern, e.g., "tok, totok," to the AUI pad 10, another sound wave is generated in response to the shape of the actuator member 20, the user's finger, or the like, such that the controller 40 receives an electrical signal having a different strength from the sound wave recognition member 30 to be able to input another instruction word.

That is, vibration characteristics of the AUI pad 10 are changed depending on when the actuator member 20 is completely grounded to the AUI pad 10 in a flat shape in a non-deformed state, or when both ends of the actuator member 20 are warped in a substantially completely deformed state and thus is not grounded to the AUI pad 10, or only one end of the actuator member 20 is warped in a partially deformed state and thus a half thereof is grounded to the AUI pad 10, and therefore even though the same touch impact is applied to the AUI pad 10, different sound waves may be generated. Therefore, the user may input various control instructions by the simple pattern and thus may easily learn the instruction words.

In addition, the vibration characteristics of the AUI pad 10 may also be changed in such a manner that all of the plurality of actuator members 20 are operated or the operation thereof stops. According to an embodiment of the present disclosure, the user may easily differentiate whether the system is activated based on the change in the vibration characteristics of the AUI pad 10 or whether the AUI pad 10 is deformed, by the actuator member 20.

That is, since the instruction words may be input only by a minor contact in terms of the characteristics of the AUI system, the user needs to determine whether the overall system is turned on/off before of the use of the AUI system. However, an embodiment of the present disclosure may help the user easily determine the turn on/off determination of the AUI system.

As described above, according to an embodiment of the present disclosure, the user may identify the portion of the AUI pad to be touched or whether the AUI pad is touched by the tactile sensation of the user's hand, or the like, without identifying the portion of the AUI pad to be touched, or whether the AUI pad is touched, with the naked eye. When the user contacts the AUI pad 10 or applies an impact to the AUI pad by his/her finger, or the like, the impact applied to the user may be reduced, the physical touch sensation, e.g., similar to that of a button, may be implemented. The user may use his/her desired functions by differentiating the functional group for each portion of the AUI pad only by his/her tactile sensation. Also, the user may input various control instructions by a simple pattern, and therefore the user may easily learn the instruction words, the controller may recognize the touch location using the single sound wave recognition member, and the controller may easily discriminate whether the system is activated based on whether the vibration characteristics of the AUI pad are changed or whether the AUI pad is deformed due to the actuator member.

Although the system for controlling a sound wave-based touch recognition interface according to an embodiment of the present disclosure has been described with reference to the accompanying drawings, the present disclosure is not limited to the above-mentioned embodiment and drawings but may be variously modified and changed within the following claims by those skilled in the art to which the present disclosure pertains.

What is claimed is:

1. A system for controlling a sound wave-based touch recognition interface, comprising:
   an auditory user interface (AUI) pad configured to transfer a sound wave;
   a sound wave recognition member configured to convert the sound wave transferred from the AUI pad into an electrical signal; and
   an actuator member attached to one side of the AUI pad and being deformable in response to the electrical signal converted by the sound wave recognition member.

2. The system according to claim 1, further comprising:
   a controller configured to receive the electrical signal from the sound wave recognition member to control the deformation of the actuator member.

3. The system according to claim 1, wherein the AUI pad is locally deformed.

4. The system according to claim 3, wherein the AUI pad is locally deformed along with the deformation of the actuator member.

5. The system according to claim 1, wherein when an external pressure is applied to the AUI pad, the AUI pad is locally deformed by the external pressure, and the actuator member is deformed by the external pressure.

6. The system according to claim 1, wherein when an external pressure is applied to the AUI pad, the AUI pad is locally deformed by the external pressure, and the actuator member is not deformed by the external pressure.

7. The system according to claim 1, wherein the actuator member is one of a plurality of actuator members, and only some of the plurality of actuator members are operated.

8. The system according to claim 1, wherein the actuator member is one of a plurality of actuator members, and all of the plurality of actuator members are operated.

9. The system according to claim 1, wherein one or more vibration characteristics of the AUI pad are changed based on when the actuator member is not deformed, when the actuator member is substantially completely deformed, or when the actuator member is partially deformed.

10. The system according to claim 9, wherein:
when the actuator member is not deformed, the actuator member is flat,
when the actuator member is substantially completely deformed, both ends of the actuator member are warped, and
when the actuator member is partially deformed, only one end of the actuator member is deformed.

11. The system according to claim 1, wherein the system for controlling the sound wave-based touch recognition interface is applied to an interface of a vehicle.

12. The system according to claim 1, wherein an operation of the actuator member stops to change one or more vibration characteristics of the AUI pad.

* * * * *